United States Patent [19]

Ross

[11] 4,140,743
[45] Feb. 20, 1979

[54] PROCESS FOR MAKING FLUID-CONTAINING STRUCTURE

[76] Inventor: Benjamin Ross, 2800 Trailway Dr., Highland Park, Ill. 60035

[21] Appl. No.: 840,731

[22] Filed: Oct. 11, 1977

Related U.S. Application Data

[60] Continuation of Ser. No. 633,485, Nov. 19, 1975, abandoned, which is a continuation-in-part of Ser. No. 471,343, May 20, 1974, abandoned, which is a division of Ser. No. 194,887, Nov. 2, 1971, Pat. No. 3,849,814.

[51] Int. Cl.² .................... B29C 5/04; B29D 31/00
[52] U.S. Cl. ............................ 264/310; 264/DIG. 60
[58] Field of Search ............... 425/425, 435, 812; 264/310, 311, DIG. 60

[56] References Cited

U.S. PATENT DOCUMENTS

| | | | |
|---|---|---|---|
| 2,153,184 | 4/1939 | Hagen | 264/310 |
| 2,629,131 | 2/1953 | Martin et al. | 264/310 |
| 3,217,078 | 11/1965 | Kleiber | 264/310 |
| 3,337,662 | 8/1967 | Spencer | 264/310 |
| 3,417,097 | 12/1968 | Droning et al. | 264/310 |
| 3,514,508 | 5/1970 | Schott et al. | 264/310 |
| 3,830,898 | 8/1974 | Johnson et al. | 264/310 |
| 4,043,721 | 8/1977 | Lemelson | 425/435 |

*Primary Examiner*—W.E. Hoag
*Attorney, Agent, or Firm*—Charles A. Laff; J. Warren Whitesel; Howard B. Rockman

[57] ABSTRACT

A molded article capable of floatably supporting a human body, which comprises a seamless fluid-containing structure having a predetermined shape, and a supporting framework or the like to laterally support the structure so that one surface of it may be used as a floatable support, said article being manufactured by a mold and molding process wherein said mold has a small hatch or other small opening for providing access to the mold interior. Said mold is rotated and heated at predeterminedd rates and under predetermined conditions until said mold interior is evenly coated with plastic, the plastic is thereafter cured, and the finished product is then removed from the mold through the hatch.

11 Claims, 15 Drawing Figures

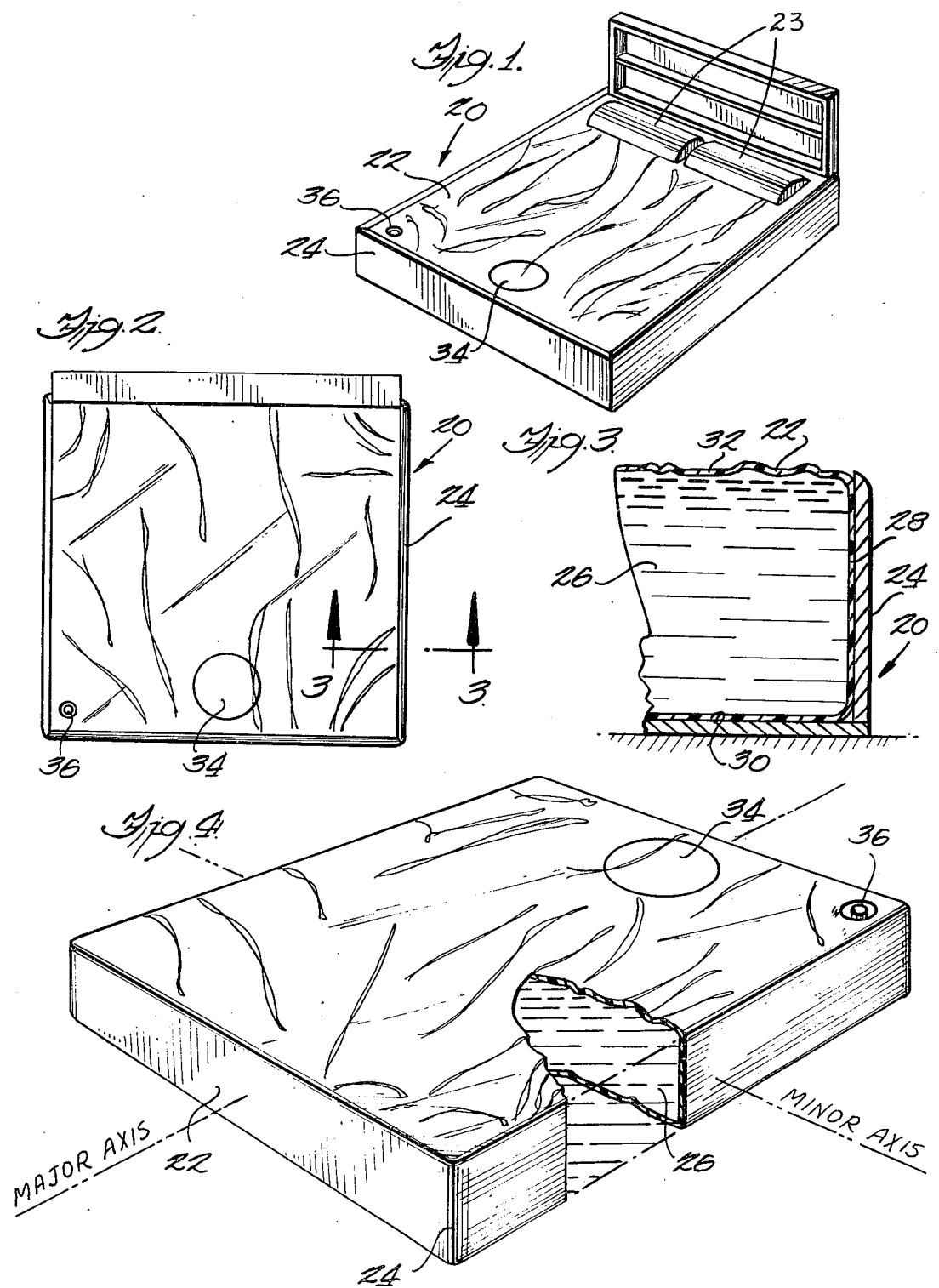

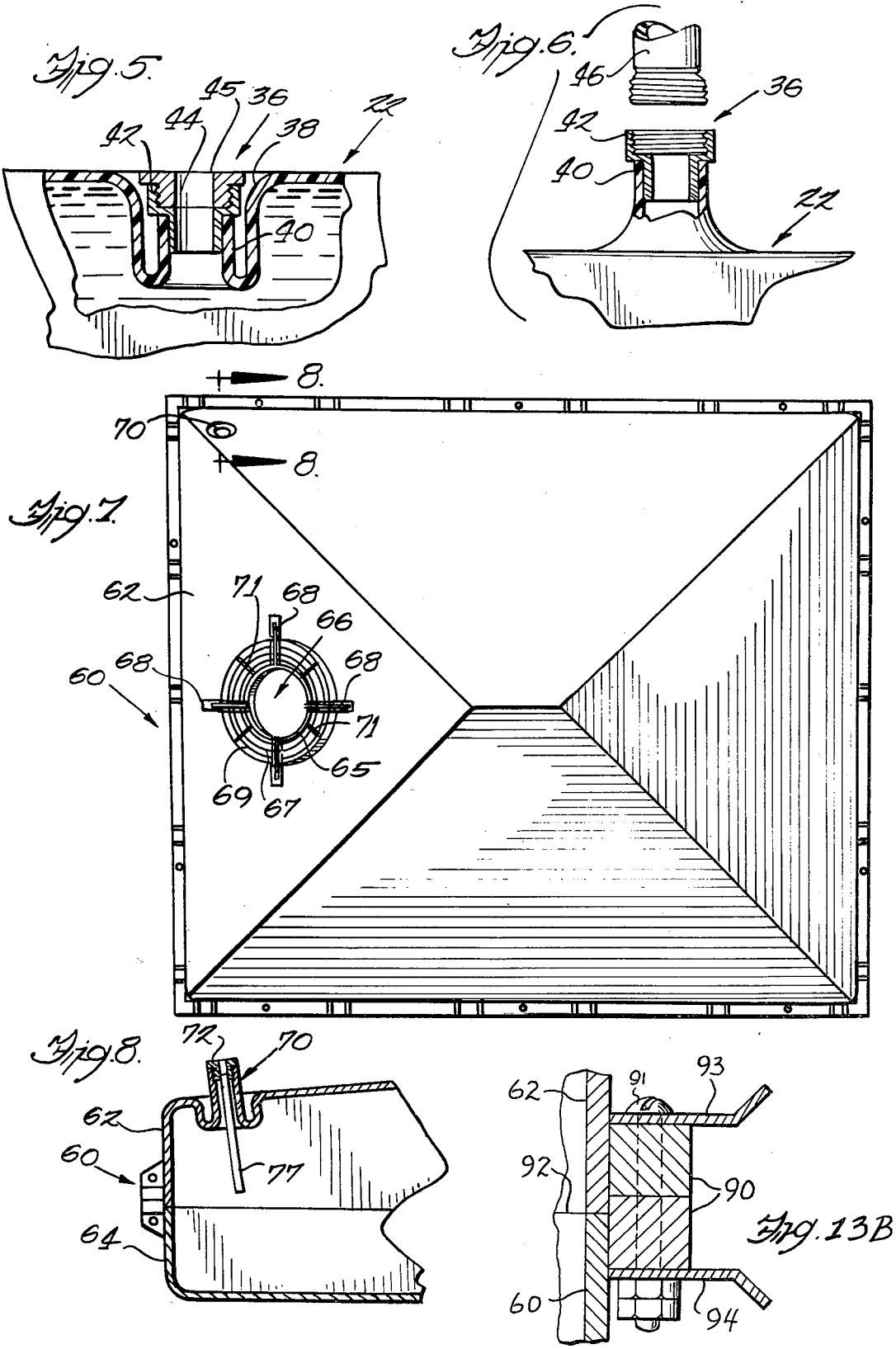

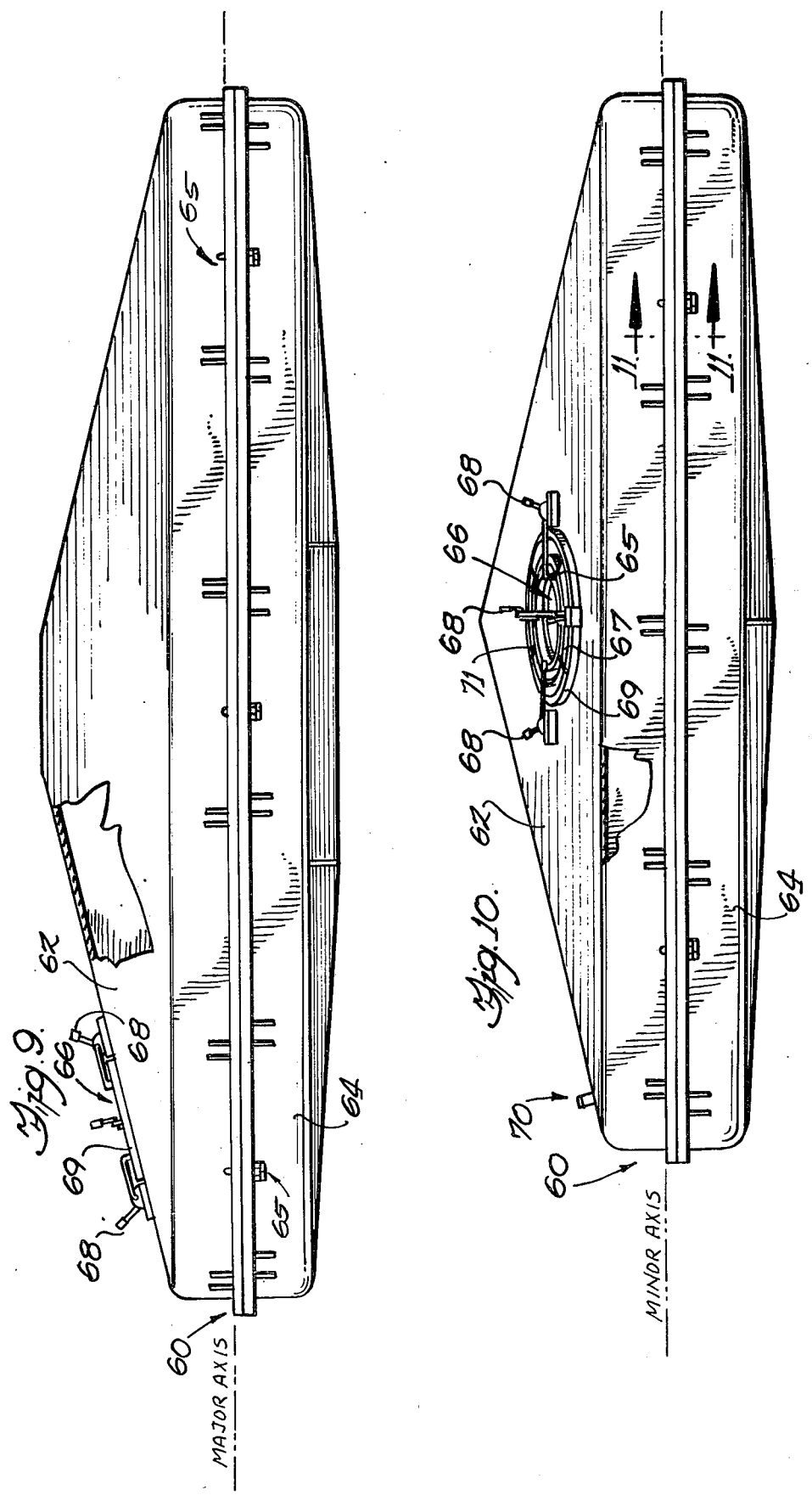

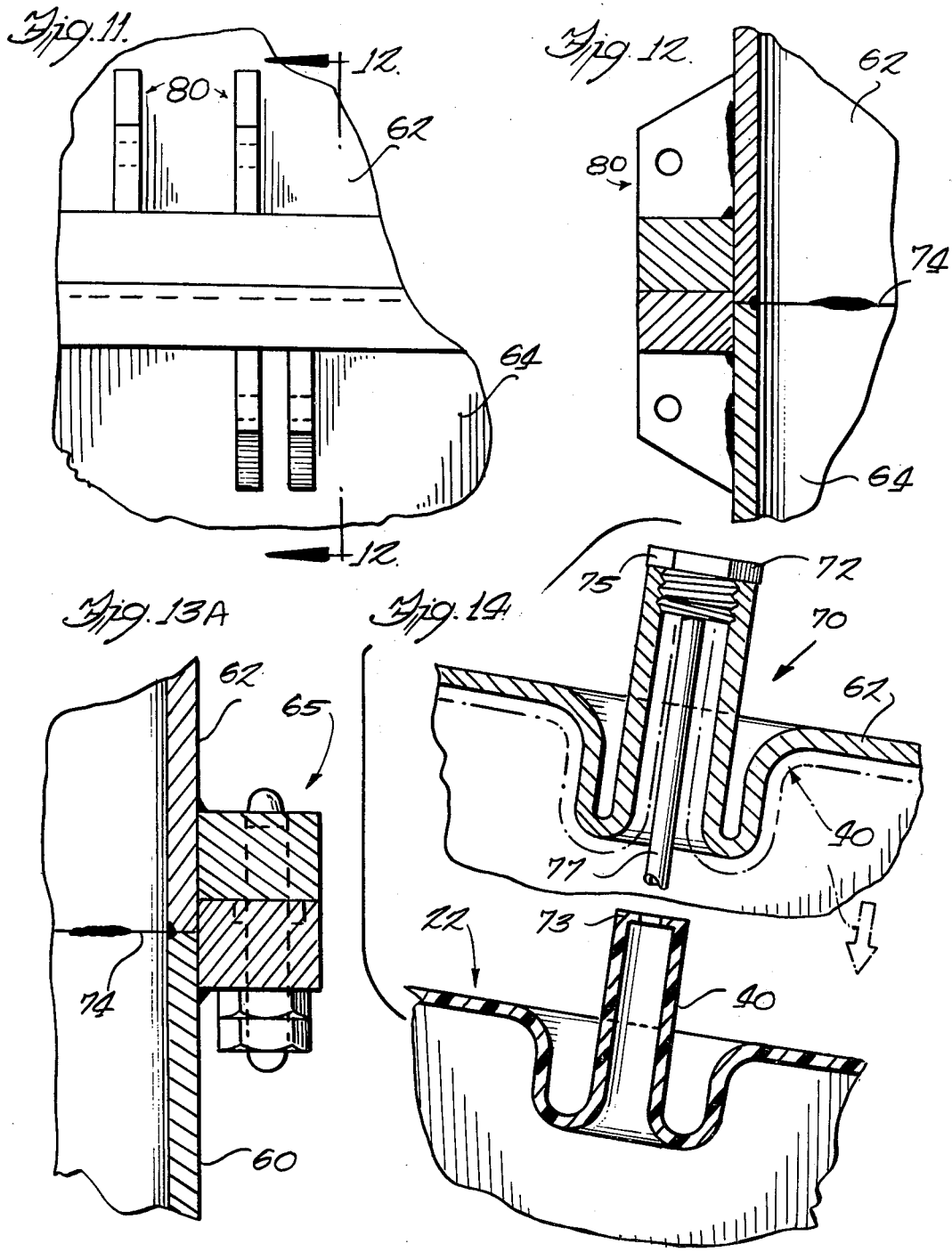

PROCESS FOR MAKING FLUID-CONTAINING STRUCTURE

This application is a continuation of Ser. No. 633,485, filed Nov. 19, 1975, (now abandoned), which is a continuation-in-part of application Ser. No. 471,343, filed May 20, 1974, now abandoned, which is a division of application Ser. No. 194,887, filed Nov. 2, 1971, now U.S. Pat. No. 3,849,814.

This invention relates to a process for making an article of furniture, and in particular, to a device for floatably supporting a human body, such as a water bed or water mattress, chair, sofa, or other device incorporating a fluid-containing structure for supporting a human body.

The water bed was originally developed as a specialized hospital device. Recently, a sealed vinyl plastic bladder was developed to contain the water and eliminate the need for conventional tanks or pools which were previously used. This development made such water-filled devices practical, for use in the average household. This vinyl bladder was combined with supporting framework to form a water bed, and is described in U.S. Pat. No. 3,585,356.

However, the sealed vinyl bladder did not solve an essential problem of water bed construction: total reliability in the containment of the water mass. Water, or any other liquid which could provide flotation and the hydraulic characteristics necessary for water bed construction, represents a destructive substance in the environment of the home. Thus, to be acceptable for widespread use by the public, the structure for containing the water or other liquid must provide virtually 100 percent (100%) reliability.

To date, fluid-filled vinyl mattresses have been fabricated from sheet materials, most commonly, sheets of polyvinyl chloride, ranging from 12 mils to 25 mils in thickness. While the vinyl sheet material has itself been largely effective, the methods used to seal the edges of the vinyl sheets have not been as effective as they could be. Heat sealing is the method most often used to seal the edges of the vinyl sheets. However, this method has inherent problems. For example, the sealing process creates a "bead" at the juncture of the edges, which, if malformed, may cause undetectable weak spots and result in a failure of the water mattress.

Weaknesses in the seams of a water mattresses may also be caused by such variables as sealing speed, temperature, and pressure, or by the destruction of certain physical properties of the polyvinyl chloride sheet during the heat-sealing process. For example, the heat generated by the sealing instrument may drive plasticizing additives out of the polyvinyl chloride, causing a brittle area alongside the seam, which has a significantly lower tolerance to pressure and flexing. Thus, there is a consequent tendency to form "runs" or openings. This type of failure of the water-containing structure is particularly destructive since it may release up to 200 gallons of water in a matter of a few seconds.

To achieve better seals on the vinyl bladders, a heat-sealed overlap seam was used. This overlap added greater structural strength to the seam, but it retained the other faults resulting from the heat-sealing process.

Another disadvantage of the bladder type, sealed mattresses is that they have no predetermined shape. Therefore, they do not fit well within the supporting frames used with them and they tend to roll off at the sides, thus creating an uneven sleeping surface.

Other disadvantages of the prior water mattresses are the difficulty in controlling their firmness and the inadequacy of the valve employed for filling the mattresses with water.

Therefore, an object of this invention is to provide a liquid-containing structure which does not have the inherent problems of seam fabrication. A further object of this invention is to provide a liquid-containing structure which is essentially a single continuous form having no seams.

A further object of this invention is to provide a liquid-containing structure which has a predetermined shape. A further object of this invention is to provide a water mattress which, when filled, has generally vertical sides that rest generally flat against the sides of a supporting frame or structure, providing a smooth and neat appearance, a complete transfer of weight and stress from the mattress walls to the frame, a more even sleeping surface, and improved means for holding the bedding in place when tucked between the mattress and frame.

Still another object of this invention is to provide a water mattress or other liquid-containing structure in which the firmness can be controlled by the amount of mattress material that is provided on the upper surface of the mattress.

Another object is to provide a seamless water-containing structure which is durable and economical to manufacture.

A further object of this invention is to provide a new process for manufacturing a water-containing structure having no seams, and a novel mold for molding a water-containing structure having no seams.

In keeping with one aspect of the invention a seamless fluid-containing structure is molded with a predetermined shape. The structure is formed by a process called rotational molding. In this process, liquid or pelletized plastic material is placed inside a mold and the mold is simultaneously heated and rotated about two axes until the internal surface of the mold is completely coated with plastic material. Thereafter, the mold is further heated until the plastic is cured and the completed structure is removed from the mold through a porthole or hatch. The mold is constructed in two sections which are permanently sealed together. Access to the interior of the mold is secured through the hatch. The parting line between the two mold sections may be welded together. If welded, the weld will be ground smooth so that there is no protruding surfaces on the inside of the mold. The mold has a domed portion which enables a person to enter the mold and accomplish the aforementioned welding operation. The domed portion also produces an excess amount of material at the upper surface of the mattress. The two sections of the mold may also be permanently sealed together through the use of a plurality of bolts which are closely spaced, next to each other.

The nature of a preferred embodiment of the invention will become more apparent from a study of the attached drawing, in which:

FIG. 1 is a perspective view of a water bed including a fluid-containing mattress structure made in accordance with this invention;

FIG. 2 is a top plan view of FIG. 1;

FIG. 3 is an enlarged view of a cross section, taken along line 3—3 of FIG. 2;

FIG. 4 is a perspective view of the fluid-containing structure shown in FIG. 1;

FIG. 5 is an enlarged detail view (partially in cross-section) showing a valve for filling the fluid-containing structure, the valve being shown in its recessed or closed condition;

FIG. 6 is a similar detail view, showing the valve of FIG. 5 (partially in cross section) in its raised and open condition, for showing the manner in which it is connected to a water source;

FIG. 7 is a top plan view of a mold embodying the invention;

FIG. 8 is a fragment view, partially in cross section, taken along line 8—8 of FIG. 7;

FIG. 9 is a front view of the mold shown in FIG. 7, with a portion cut away and shown in cross section;

FIG. 10 is a side view of the mold shown in FIG. 7 with a portion cut away and shown in cross section;

FIG. 11 is an enlarged fragmentary view taken along lines 11—11 of FIG. 10;

FIG. 12 is an enlarged fragmentary view (partially in cross section) taken along lines 12—12 of FIG. 11;

FIGS. 13A, B are two embodiments of enlarged fragmentary views (partially in cross section) showing the manner in which the mold parts are bolted together; and FIG. 14 is an exploded view showing the formation of the valve portion of the mattress in the mold and after the mattress is removed therefrom.

In FIG. 1, a water bed 20 has a fluid-containing mattress 22, pillows 23 and a frame 24. The frame may be constructed of wood or other suitable rigid material. The size of the mattress and frame is irrelevant. Obviously, it will have a size and shape designed to accommodate the human body. Currently, popular sizes are described as youth, single, double, queen and king sizes, which may have extra length. However, these sizes change with the times. Therefore, the invention is not to be construed or limited in terms of current fads, popular styles or the like.

The mattress 22 is preferably constructed of a high molecular weight vinyl plastic. The thickness of the mattress walls should be sufficient to make the mattress generally puncture resistant. This resistance may be accomplished with a wall thickness of about 35 mils and approximately 45 mils at the corners. Preferably, the material is translucent so that air bubbles can be readily detected and removed after the mattress is filled with water. The vinyl should have high tensile strength, ranging, for example, from about 1350 to 1800 pounds per square inch, should be highly flexible at room temperature, should not stretch when it is deformed or flexed, and preferably should be able to withstand exposure to anti-bacterial and anti-algai additives. The mattress 22 should be able to withstand continuous exposure temperatures up to at least 110° F., and preferably should remain non-brittle at temperatures as low as −10° F.

The mattress 22 has a predetermined cubic shape so that it conforms to, and fills, the rectangular frame 24. The mattress has no seams because it is molded into a predetermined shape, rather than manufactured from sheets which are cut into forms and secured together. As shown in FIG. 3, the mattress 22 is filled with water 26, or any other suitable fluid. (Hereafter generically called "water"). The sides 28 of the fluid-filled mattress 22 fit snugly against the side of the frame 24. The bottom 30 of the mattress 22 rests on the bottom of the frame. The corners formed by the sides and bottom of the mattress are generally accuate-shaped.

The top 32 of the mattress 22 is provided with excess material so that the sides will not be drawn inward. Hence, this excess material overcomes a problem which exists when sealed bladders are used as a water mattress. This feature and the fact that the mattress has a given shape enables the mattress to fit precisely within a frame. The vinyl bladder type mattresses do not have a predetermined shape and thus are squeezed within frames, which prevents satisfactory control of firmness.

In the present invention, the firmness of the mattress 22 is controlled by the amount of excess material formed on the top 32. Thus, the water level is generally always the same. A conventional heater, not shown, may be used to warm and maintain the water 26, at an elevated temperature, if desired.

The frame not only contains the mattress 22, but also provides additional protection against water spillage. The frame may be made watertight by lining it with any suitable watertight material such as a plastic sheet, for example, so that if the mattress should leak, the water is contained within the frame. In order to serve the latter purpose, the depth of the water in the mattress should not exceed the height of the frame. Otherwise, if the mattress were punctured, water might spill over the edge of the frame. The ideal depth of the water should be approximately the actual height of the frame, for if the frame exceeds the depth of the water in the mattress by too great an amount, the user would have difficulty in reaching and leaving the sleeping surface of the mattress. Since the water level is usually maintained as its ideal depth, the level remains substantially the same for any given mattress, i.e., the same height as the frame. The firmness of the mattress is, therefore, not controlled by varying the quantity of water therein. Rather, in the present invention, firmness is controlled by the selection of the amount of excess material forming the upper mattress surface. In general, the amount of excess material should vary from about two inches of excess in both length and width for a firm surface to about six inches of excess in each dimension for a very soft surface. Since good support in a water bed depends on the contour of the surface, it should be as soft as is feasible, without being so slack that the person supported thereby rests on the bottom of the mattress.

As we shall hereinafter show, the excess material is included in the mattress surface by providing a dome in the mold. The amount of excess material in the mattress is varied by variations in the shape of the dome, particularly by variations in the height thereof.

A ridge of plastic material 34 is formed on the mattress surface by a hatch provided in the mold for removing the molded structure, all of which will be hereinafter described. This ridge is small, does not affect the quality of the mattress, and can be covered by a label, or the like.

FIGS. 1, 2 and 4 show valve means 36, on the top surface 32 of the mattress 22, for filling or draining the mattress 22. When the mattress is filled and in use, the valve means 36 is recessed so that it does not protrude above the surface of the mattress. In this way, the valve means does not interfere with a person lying on the mattress.

FIGS. 5 and 6 show the valve means 36 in detail. A recess or well 38 is formed in the mattress surface, generally at a corner of the foot of the mattress. A small tubular neck 40 extends upward about three (3) inches from the bottom of the well. Only a small circumferential space exists between the wall of the neck 40 and the outer wall defining the well 38. The neck is approximately ¾ inch in diameter, although any suitable size may be employed. A fitting 42 is glued or otherwise fastened inside the tubular neck 40. If desired, a fitting could be fastened to the outside of the neck 40 in lieu of the assembly shown. The fitting is preferably threaded and adapted to receive a threaded cap or stopper 44 which forms a watertight closure. The top 45 of the cap may be constructed of plastic and should not extend above the surface of the mattress 22. A conventional female garden hose coupler may be used as the fitting 42. To fill the mattress 22, the neck 40 is pulled upward (FIG. 6), the cap 44 is removed, and a hose 46 (FIG. 6) is threadably connected to the fitting 42. The hose, which may be an ordinary garden hose, is connected to any suitable water source, such as a faucet, and the mattress is filled.

The ability of the neck 40 to be pulled upward aides draining, as well as filling, and reduces the chances for water spillage because the opening is above the water level. This design of the valve means 36 is especially helpful in bleeding air bubbles from the mattress—a procedure which is necessary to achieve proper surface characteristics and to stop a sloshing noise which might otherwise irritate a water bed user. After the mattress is filled, the cap 44 is securred in place, and the valve assembly 36 is snapped back into its recessed position (shown in FIG. 5).

The seamless water mattress 22 of this invention is formed by a process called rotational molding. In this process, liquid or pelletized resinous plastic material is placed inside a mold. The mold is closed, placed on a rotational molding machine, and simultaneously heated and rotated about two different axes, referred to herein as the major and minor axis, (FIGS. 4, 9, 10) until the internal surface of the mold is coated with molten plastic. The initial rotation may be performed by switching on any motor used for rotating the mold. However, it may be preferable to initially rotate the mold manually to be sure that the internal mold surface is completely covered and to avoid unsightly surface blemishes.

As soon as the internal mold cavity is completely coated, the mold, as it continues to rotate, is further heated, curing the plastic so that it gels. Once the plastic is properly cured and hardened rotation is terminated. The mold is opened, and the molded article is deflated, and removed from the mold.

Rotational molding, per se, is well known, however, objects as large as water mattresses, which must be fail safe, and which may have a total average weight of about 30 pounds, have not heretofore been molded by this rotational process. To achieve a satisfactory product, several steps have been incorporated in the molding process. Calcium oxide and a silicone base surfactant have been added to the plastic. The former acts to eliminate excess moisture and the latter eliminates air bubbles from the finished product.

EXAMPLE I

It has been found that, when using a liquid plastisol, such as high molecular weight liquid polyvinyl chloride having a gel point of about 200° F., the mold should first be rotated at a temperature of about 250° F., for approximately three minutes, and the temperature of the material should then be increased to approximately 550° F. and maintained, there for about 11 minutes, until the plastic gels. At these conditions, the mold is preferably rotated about the major axis at about 2½ r.p.m. and about the minor axis at about 11 r.p.m. A rotational speed ratio between the two axes of 1:4 has been found desirable.

EXAMPLE II

A liquid plastic, preferably polyvinyl chloride, is thinned with a suitable plastic thinner, which will not change the characteristics of the plastic. This plastic (about 38 pounds) is then placed inside the mold together with a surfactant, which is rotated by hand for about 90 seconds. The thinness of the plastic keeps it in the bottom of the mold to insure good coverage. Care is taken to be sure that the entire interior of the mold cavity is covered by the plastic. The thinning is sufficient to reduce air bubbles by breaking surface tension. During this stage of this process the mold should be about 105° F. so that it may be touched by the operator.

Thereafter, at a heat of preferably about 140° F. (or, e.g., a range of about 140°–200° F.) the mold is rotated for approximately 8 minutes, or until the plastic reaches the slush and stops running. Care must be taken to insure good mold coverage before the plastic becomes slushy. Then, the mold is heated for about 8 minutes to approximately 550° F., whereupon the plastic becomes a gel, and then cures.

In this example, the mold rotates approximately four complete revolutions about the major axis for every ten and one-half revolutions around the minor axis. Hence, the preferred ratio of rotational speeds between the two axes is approximately 1 to 2.5.

The cooling cycle varies with changes in humidity. Usually, the mold is cooled by a water spray which may last for a period of about 4 to 10 seconds. Care should be taken to maintain a uniform mold wall temperature throughout the cooling cycle, and to avoid hot or cold spots on the mold wall.

FIGS. 7 to 14 illustrate the mold 60 used to manufacture the mattress 22. The mold is preferably constructed of aluminum in sheet metal form, because of its properties of rapid heat transfer, lightweight, and relatively low porosity. This allows a more precise control of the heating and cooling rates and results in greater uniformity of the mattress wall thickness, the absence of drips and runs in the mattress surfaces, and less tendency toward air bubbles in the finished product.

The mold is preferably constructed from two parts 62 and 64 (FIGS. 9 and 10) which may be connected together in any suitable manner. In one embodiment (FIG. 13A), the two parts are first bolted or clamped together. Then, the two parts are permanently welded together at 74, and the weld is thereafter ground smooth on the inside of the mold, as seen in FIG. 13A.

In another embodiment, the two halves are merely bolted together (FIG. 13B) with no welding provided. Here, the mold halves have thick edges along their perimeter, as shown at 90. The mold parts are joined together by bolts 91 which are fitted into closely spaced holes through these thick perimeter edges. The bolts are so close to each other that the parting line 92 is almost non-existent between the mold halves 62, 64. Simultaneously, outwardly projecting upper and lower fins 93, 94 are bolted in close physical contact with the thick edges 90. These fins dissipate heat from the edges 90 so that the mold has the same thermal characteristics throughout. Otherwise, it is possible that the thick edges would act as heat sinks to collect the heat in the mold, and thereby form hot spots.

The manner in which the two parts 62 and 64 are connected together is shown in detail in FIGS. 11-13. An aligning pin assembly 65 is provided for assuring that the parts are properly aligned for welding, as shown in FIG. 13. The weld is made on the inside of the mold and then is ground down so that the interior mold surface of the weld bead is smooth and uniform, with the remainder of the mold interior. Since the purpose of the welding operation is to achieve a smooth and uniform interior surface of the mold, any other suitable means may also be used to accomplish this end. The mold parts 62 and 64 are permanently sealed together because the size of the mold makes it impractical to clamp and unclamp the mold parts after each operation. Moreover, if the parts 62 and 64 were not welded together and the weld ground smooth in the manner described, a parting line or ridge would be formed about the periphery of the molded plastic article which would be undesirable. While such a parting line would probably not affect the quality of the mattress construction, it would greatly reduce its saleability, as a seamless mattress, because it would appear to be a seam.

The upper portion 62 of the mold 60 has a domed shape, and a hatch 66 produces an excess amount of material on the sleeping surface of the mattress 22. The height or size of the dome may be increased to provide more excess material and a softer mattress; or, the height or size of the dome may be decreased to provide less excess material and a firmer mattress. Because the upper and lower parts 62 and 64 are sealed together, the hatch 66 is necessary to provide access to the mold interior for charging raw plastic material into the mold before each operation and for removing the finished article after the process is complete. The hatch 66 is approximately 18 inches in diameter and has a ring 65 made from aluminum bar stock spot welded to it. Two spaced concentric rings 67 and 69, also constructed from aluminum bar stock, are spot welded to the mold and heated in concentric relation to the ring 65. The rings 67 and 69 are held together by an aluminum brace 71. Rings 67 and 69 are spaced to allow heat dissipation and avoid overheating of the mold in the hatch area. The hatch 66, which is removable, is held in place by a plurality of conventional quick-release clamps, which are attached to the hatch ring 65 and the mold rings 67 and 69. The clamps 68 act as the means for opening and sealing the hatch.

FIGS. 11 and 12 show brackets 80 for attaching a network of steel tubing, called spidering (not shown), to the mold in order to support the weight of the mold when it is mounted on the rotational molding machine arm and, also, to prevent the mold from flexing during use.

Also provided in the upper portion 62 of the mold 60 is an element or bung 70 for forming the filler tube or neck 40, which forms part of the valve means 36 (see FIGS. 7, 8 and 14). The element 70 is located in one corner of the mold portion 62 and is provided with a venting means 72 for releasing air from the mold during the molding process. The venting means 72 consists of a threaded removable cap 75 and a copper tube 77 centrally located in said cap 75. The tube 77 extends down and beyond the bottom of the element 70 into the mold. The tube 77 must have a large enough opening to enable adequate venting and must not contact the walls of element 70. While the venting means creates an imperfection in the filler tube, this imperfection occurs in the top portion or tip 73 of the tube 40, which portion is cut off to attach the hole coupler 42. Venting is important because the large volume of air in the mold creates substantial pressures during the molding process, which, if not released, cause dangerous stress on the mold and accentuate the parting line 34 created by the hatch 66.

FIG. 14 shows how the filler tube 40 is formed in, and removed from, the element 70. After the mattress is formed, the venting means 72 are removed by unscrewing and removing the cap 75 and attached tube 77. A vacuum pump (not shown) is attached and air is removed thereby, so that the mattress collapses. Once collapsed, the finished mattress is pulled out of the mold through hatch 66. After removal of the mattress 22 from the mold, the tip 73 of the filler tube 40 is cut off, the fitting 42 is attached, and the mattress 22 is complete.

Raw plastic is thereafter introduced into the mold through the hatch 66, the hatch is closed and sealed by the clamps 68, and the forming cycle is again started.

Besides its contribution to the manufacture of the seamless article 22, the hatch 66 aids in the fabrication of the mold 60. Combined with the domed portion 62, the hatch enables a person to enter the mold to perform welding operations which can be used to permanently seal together the mold portions 62 and 64, as described hereinbefore.

While specific embodiments of this invention have been shown, modifications thereof may be made which fall within the spirit and scope of this invention, and it is therefore intended to cover all such embodiments and any such modifications by the appended claims.

What is claimed is:

1. A manufacturing process for molding very large seamless plastic containers having a size in the order of a mattress for supporting a human body, said process consisting essentially of the steps of:
   (a) loading a charge of plastisol into a mold having a large closed cavity with walls made of thin heat conductive sheet metal, said large closed cavity being terminated in at least one access hatch which is much smaller than the surface of the mold in which it is located;
   (b) maintaining a uniform initial temperature across the surface of said sheet metal mold so that said surface is free of localized hot and cold spots;
   (c) said process including rotating said mold manually during a brief period after the loading during step (a) and before the start of initial heat cycle period of step (b) in order to insure that the entire internal cavity surface is thoroughly wetted by said plastisol during said manual rotation;
   (d) continously, throughout the manufacturing process, rotating said mold simultaneously about a major and minor axis, the mold turning at two separate low speeds about said axes with the rate of turning about the major axis being about 3 r.p.m. and the speed ratio between the major and minor axes being in the range of 1:2.5 to 1:4.;
   (e) increasing the temperature of said mold from the initial temperature of step (b) to an intermediate temperature for an initial heat cycle period during which the plastisol reaches a slush point;
   (f) elevating the temperature of the mold above the intermediate temperature of step (d) to a high temperature for a final heat cycle period during which the plastic reaches a hardened and cured state;

(g) cooling the mold uniformly from said high temperature of step (e) to approximately the initial temperature of step (b); and (h) collapsing and extracting the cured plastic container by drawing it in said collapsed condition through said hatch and from the mold.

2. The process of claim 1 wherein said large mold is approximately the size of a king-size mattress and said charge of plastisol is approximately 38 pounds of thinned polyvinyl chloride.

3. The process of claim 1 wherein said initial temperature of step (b) is approximately 105° F.

4. The process of claim 1 wherein said brief period of manual rotation lasts for about 90 seconds.

5. The process of claim 1 wherein said continuous rotation throughout the manufacturing process is at a turning ratio of approximately four turns about one of said axes for every ten-and-one-half turns about the other of said axes.

6. The process of claim 1 wherein said continuous rotation throughout the manufacturing process is at a turning ratio of approximately one turn about one of said axes for every 4 turns about the other of said axes.

7. The process of claim 6 wherein said pair of axes are mutually perpendicular.

8. The process of claim 6 wherein said intermediate temperature of step (d) is in the range of 140°–200° F. and said initial heat cycle period is about 8 minutes.

9. The process of claim 8 wherein said high temperature of step (e) is approximately 550° F. and said final heat cycle period is about 8 minutes.

10. The process of claim 9 wherein said cooling step (f) comprises spraying said mold with a water spray which uniformly cools the thin sheet metal walls of said mold without causing hot or cold spots thereon.

11. The process of claim 10 and the added step of continuously venting said cavity during molding during the entire process.

* * * * *